United States Patent
Wang et al.

(10) Patent No.: US 9,703,377 B2
(45) Date of Patent: Jul. 11, 2017

(54) WEARABLE TRIGGERING DEVICE

(71) Applicant: Acer Incorporated, New Taipei (TW)

(72) Inventors: Jian-Siang Wang, New Taipei (TW); Hung-Chi Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 113 days.

(21) Appl. No.: 14/887,342

(22) Filed: Oct. 20, 2015

(65) Prior Publication Data

US 2017/0017300 A1    Jan. 19, 2017

(30) Foreign Application Priority Data

Jul. 14, 2015   (TW) .............................. 104122690 A

(51) Int. Cl.
| | | |
|---|---|---|
| *G06F 3/01* | (2006.01) | |
| *G06F 3/02* | (2006.01) | |
| *G06F 3/0488* | (2013.01) | |
| *G06F 1/16* | (2006.01) | |
| *G06F 3/03* | (2006.01) | |
| *G06F 3/0354* | (2013.01) | |

(52) U.S. Cl.
CPC .............. *G06F 3/014* (2013.01); *G06F 1/163* (2013.01); *G06F 3/016* (2013.01); *G06F 3/017* (2013.01); *G06F 3/0227* (2013.01); *G06F 3/0304* (2013.01); *G06F 3/03543* (2013.01); *G06F 3/0488* (2013.01); *G06F 2203/0331* (2013.01); *G06F 2203/0383* (2013.01)

(58) Field of Classification Search
CPC .......................... G06F 2203/0331; G06F 3/014
See application file for complete search history.

(56) References Cited

U.S. PATENT DOCUMENTS

| | | | |
|---|---|---|---|
| 2010/0253628 A1* | 10/2010 | Jacke ...................... | G06F 3/033 345/163 |
| 2011/0210931 A1* | 9/2011 | Shai ........................ | G06F 3/014 345/173 |
| 2012/0029399 A1 | 2/2012 | Sankai | |
| 2014/0273917 A1 | 9/2014 | Kalliovaara | |
| 2016/0077582 A1* | 3/2016 | Song ....................... | G06F 3/0338 345/173 |

FOREIGN PATENT DOCUMENTS

TW             M447530           2/2013

* cited by examiner

*Primary Examiner* — Priyank Shah
(74) *Attorney, Agent, or Firm* — Jianq Chyun IP Office

(57) ABSTRACT

The wearable triggering device of the disclosure includes a base, a pressing element, a key structure and a wearable element. The pressing element is pivotally disposed on the base. The key structure is disposed between the base and the pressing element. The wearable element is disposed on the base, so that the wearable triggering device is adapted to be fixed at a body through the wearable element. When the body contacts another body through the wearable triggering device, the body provides an external force to the pressing element, so as to make the pressing element move toward the base and trigger the key structure.

18 Claims, 3 Drawing Sheets

WEARABLE TRIGGERING DEVICE

CROSS-REFERENCE TO RELATED APPLICATION

This application claims the priority benefit of Taiwan application serial no. 104122690, filed on Jul. 14, 2015. The entirety of the above-mentioned patent application is hereby incorporated by reference herein and made a part of this specification.

BACKGROUND OF THE DISCLOSURE

1. Field of the Disclosure

The disclosure relates to a triggering device, and more particularly, to a wearable triggering device.

2. Description of Related Art

In recent years, as the technology industries develop, electronic devices, such as notebook (NB) computers, tablet personal computers (tablet PC), smart phones and the like, have become very common in our daily life. The electronic device is generally provided with a processor, a circuit board, a battery, an input/output interface (e.g., a display panel, a touch panel or a keyboard module), or other suitable electronic assembly, so as to increase the function. Therefore, the types and functions of the electronic devices are becoming more and more diverse, and these electronic devices can be used for different purposes according to the user's needs.

Taking a keyboard module as an example, a common electronic device, e.g., a notebook computer or a personal computer, is provided with a mechanical type keyboard, generally. The advantage of the mechanical keyboard is that the moving distance of the key structure thereof is comparatively longer, the user may feel a significant operating feeling when pressing the keyboard module. However, the mechanical keyboard is not suitable for the electronic products which pursue light and thin. Accordingly, currently there are some electronic devices, such as thin lightweight notebook computers, which tend to use membrane keyboard (a membrane circuit collocated with a key structure) and have a shorter moving distance. Alternatively, currently there are some electronic devices, such as tablet computers, displaying an image of a keyboard module by the collocation of a touch panel and a display panel without a real keyboard module (do not have a moving distance), such that the user may not feel any operating feeling when pressing the keyboard module mentioned above with the finger.

SUMMARY OF THE DISCLOSURE

The disclosure provides a wearable triggering device, which may increase the operating feeling when the user triggering the body.

The wearable triggering device of the disclosure includes a base, a pressing element, a key structure and a wearable element. The pressing element is pivotally disposed on the base. The key structure is disposed between the base and the pressing element. The wearable element is disposed on the base, so that the wearable triggering device is adapted to be fixed at a body through the wearable element. When the body contacts another body through the wearable triggering device, the body provides an external force to the pressing element, so as to make the pressing element move toward the base and trigger the key structure.

In light of the above, in the wearable triggering device of the disclosure, the wearable triggering device is adapted to be fixed at a body through the wearable element, for example fixed at a user's finger, and when the body contacts another body through the wearable triggering device, i.e., when the user's finger contacts an electronic device through the wearable triggering device, the body provides an external to the pressing element, so as to make the pressing element move toward the base and trigger the key structure. As such, the key structure may provide an operating feeling of imitating mechanical keyboard when the user operates the electronic device through the wearable triggering device. Accordingly, the wearable triggering device may increase the operating feeling when the user triggers the body.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
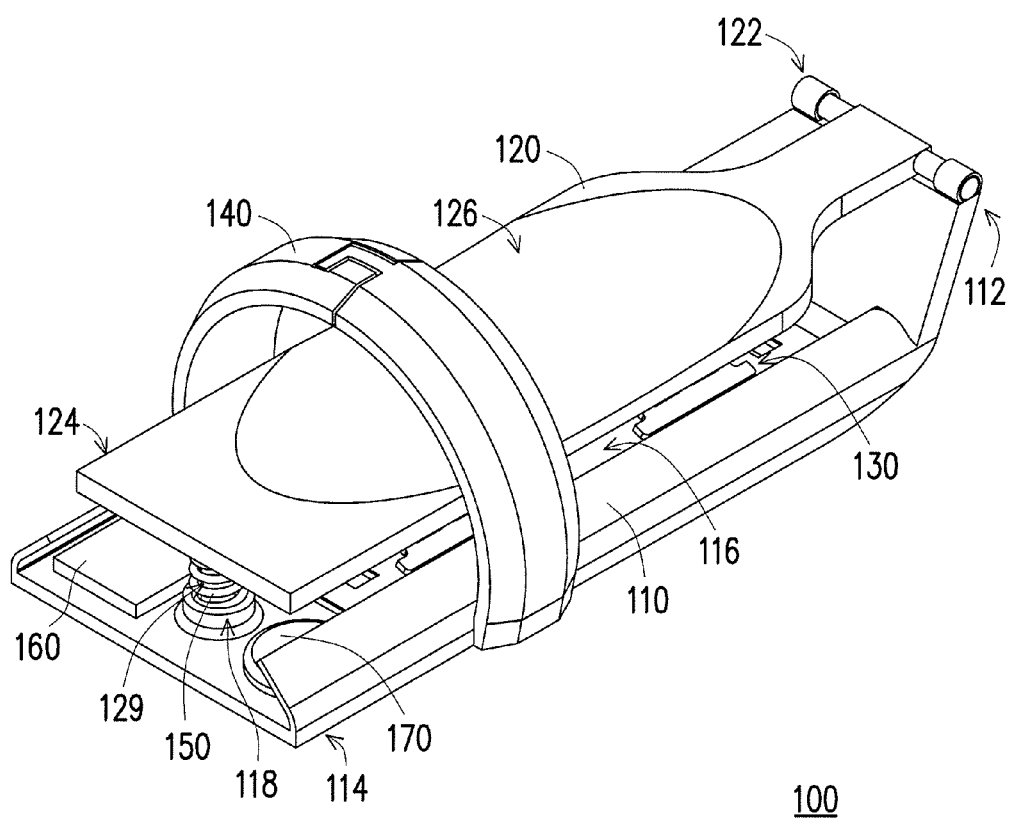
FIG. 1 is a perspective view illustrating a wearable triggering device according to an exemplary embodiment of the disclosure.
Figure 2:
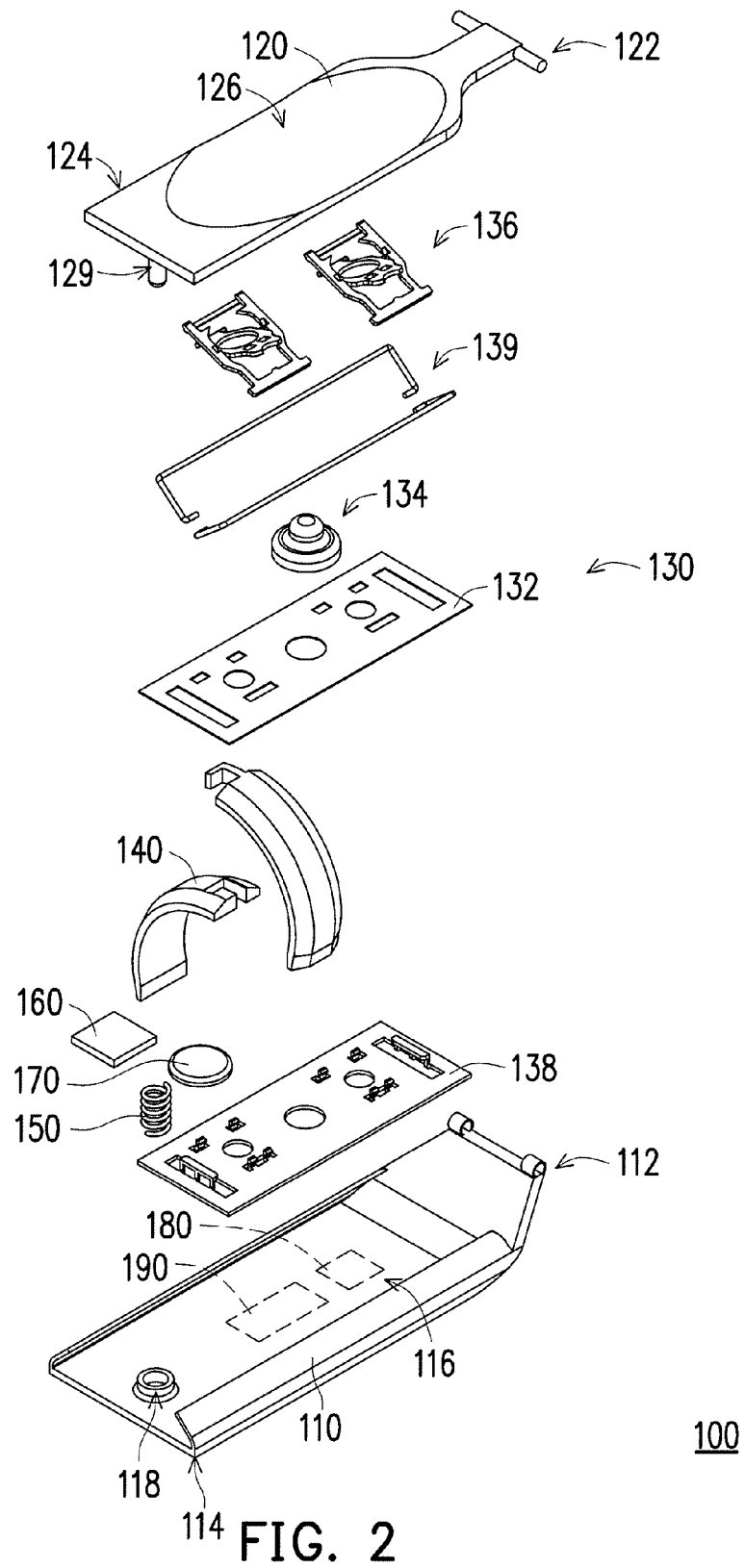
FIG. 2 is an exploded view of the wearable triggering device of FIG. 1.

FIG. 1 is a perspective view illustrating a wearable triggering device according to an exemplary embodiment of the disclosure. FIG. 2 is an exploded view of the wearable triggering device of FIG. 1. Referring to FIG. 1 and FIG. 2, in the present embodiment, the wearable triggering device 100 includes a base 110, a pressing element 120, a key structure 130 and a wearable element 140. The pressing element 120 is pivotally disposed on the base 110. The key structure 130 is disposed between the base 110 and the pressing element 120. The wearable element 140 is disposed on the base 110, so that the wearable triggering device 100 is adapted to be fixed at a body (e.g., a user's finger) through the wearable element 140. When the body contacts another body (e.g., the electronic device) through the wearable triggering device 100, the body provides an external force to the pressing element 120, so as to make the pressing element 120 move toward the base 110 and trigger the key structure 130. In other words, the user may fix the wearable triggering device 100 on the body through the wearable element 140, e.g., fixed on the finger, and then operate the electronic device through the wearable triggering device 100, e.g., contact the electronic device which has a touch control function, and further take the wearable triggering device 100 as a medium for operating electronic device. During the process that the user operates the electronic device by using the wearable triggering device 100, the user's finger provides an external force to the pressing element 120, so as to make the pressing element 120 move toward the base 110 and trigger the key structure 130. As such, the wearable triggering device 100 may increase the operating feeling when the user triggers the body.

Specifically, in the present embodiment, substantially the base 110 is a plate-shaped component and has a first end 112 and a second end 114 opposite to each other. Similarly, substantially the pressing element 120 is a plate-shaped component, and the pressing element 120 has a third end 122 and a fourth end 124 opposite to each other. The pressing element 120 is pivotally disposed on the first end 112 of the base 110 through the third end 122 thereof, and the fourth end thereof 124 corresponds to the second end 114. Moreover, the base 110 has an accommodating region 116 located between the first end 112 and the second 114. The key structure 130 is disposed between the base 110 and the pressing element 120, and located within the accommodating region 116. In addition, the pressing element 120 has a pressing portion 126 located between the third end 122 and the fourth end 124. The pressing portion 126 is substantially a concave surface concaved toward the base 110, and adapted to accommodate a user's finger. However, in other embodiments which are not shown in the drawings, the pressing element 126 may also be a plane surface. The shapes of the base 110 and the pressing element 120 are not limited in the disclosure and may be modulated as required.

Furthermore, in the present embodiment, the wearable element 140 is a snap ring, for example, and preferably made of a soft material and adapted to be fixed on the user's finger, however in other embodiments which are not shown in the drawings, the wearable element may also be a glove, a finger cot, or any other component with comfort and suitable to be fixed, and the disclosure does not limit the types thereof. Accordingly, when the user fixes the wearable triggering device 100 on the finger thereof through the wearable element 140, the user's finger is located between the wearable element 140 and the pressing element 120, preferably contact with the pressing portion 126 of the pressing element 120. When the user's finger contacts the electronic device, for example, the touch control surface of the touch control electronic device, through the wearable triggering device 100, the user provides an external force by the finger to the pressing element 120, so as to make the pressing element 120 move toward the base 110 and trigger the key structure 130. As such, the user may have an operating feeling of imitating mechanical keyboard (the operating feeling is like pressing a mechanical keyboard), and the wearable triggering device 100 may also execute the related actions (e.g., starting or executing corresponding programs) of the electronic device after the user touches it. Namely, the action of increasing the operating feeling through the wearable triggering device 100 does not affect the touch control action done to the electronic device by the user.

Figure 3:
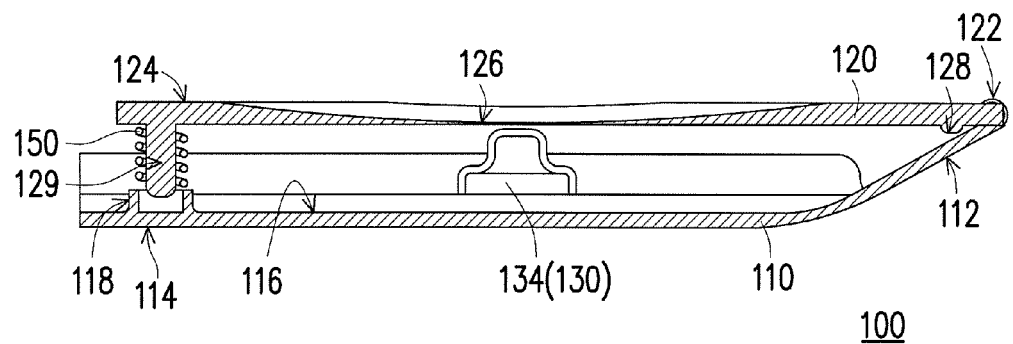
FIG. 3 is a schematic side view of the wearable triggering device of FIG. 1.
Figure 4:
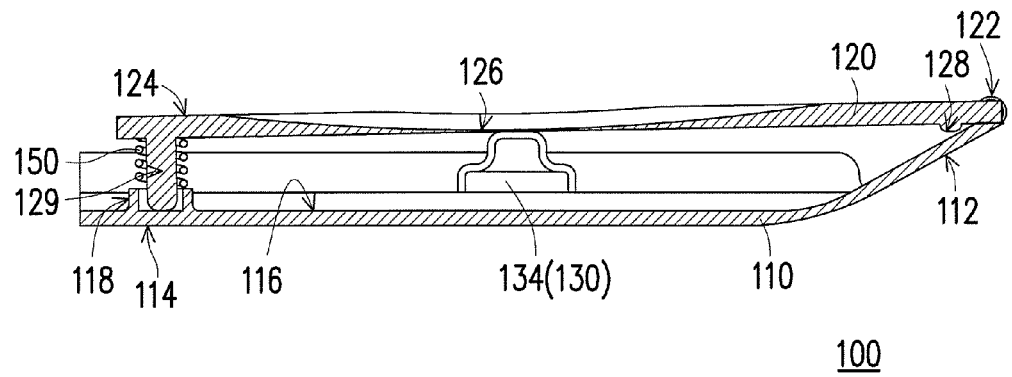
FIG. 4 is a schematic operating view of the wearable triggering device of FIG. 3.

FIG. 3 is a schematic side view of the wearable triggering device of FIG. 1. FIG. 4 is a schematic operating view of the wearable triggering device of FIG. 3. Referring to FIG. 1 through FIG. 4, in the present embodiment, the pressing element 120 has a protruding point 128 located at the third end 122. The protruding point 128 protrudes toward the base 110 and props on the base 110. Further, when the body (i.e., the user's finger) does not provide an external force to the pressing element 120, the protruding point 128 may be separated from the base 110 by a gap, or may also prop on the base 110, when the body provides an external force to the pressing element 120, an end of the pressing element 120 (namely, the fourth end 124), which is away from the protruding point 128, may move toward the base 110 due to deformation. Namely, when the pressing element 120 is subjected to the external force and moves toward the base 110, the third end 122 of the pressing element 120 merely generates a slight movement or does not move because of the restriction that the protruding point 128 props against the base 110, and the fourth end 124 of the pressing element 120 generates a larger moving distance and further triggers the key structure 130. Accordingly, the operating feeling of the wearable triggering device 100 (come from the moving distance of the fourth end 124 of the pressing element 120) may be changed by adjusting the length of the pressing element 120 and the position of the protruding point 128. For instance, when the length of the pressing element 120 is increased, or when the position of the protruding point 128 is far from the fourth end 124 and near to the third end 122, the moving distance of the fourth end 124 may be increased, so that the operating feeling of the wearable triggering device 100 is more significant.

In addition, in the present embodiment, the pressing element 120 has a position limiting post 129, and the base 110 has a position limiting hole 118. The position limiting post 129 is located at the fourth end 124 and extends toward the base 110. Similarly, the position limiting hole 118 is located at the second end 114, and actually is a hollow protruding post extending toward the pressing element 120 from the base 110, and thus the position limiting hole 118 may be taken as extending toward the pressing element 120. Preferably, the extending direction of the position limiting post 129 and the extending direction of the position limiting hole 118 are substantially parallel to the external force direction. Accordingly, the position limiting post 129 passes through the position limiting hole 118 and moves along the position limiting hole 118 when the pressing element 120 moves toward the base 110, so as to be used for limiting the moving direction of the pressing element 120 that moves toward the base 110 (substantially parallel to the external force direction). However, the position limiting post 129 and the position limiting hole 118 are not limited to be disposed or not in the disclosure and may be modulated according to actual requirements.

In addition, in the present embodiment, the abovementioned wearable triggering device 100 further includes an elastic element 150 disposed between the pressing element 120 and the base 110. More specifically, the elastic element 150 is a coil spring, for example, and adapted to be disposed around the outer side of the position limiting post 129 and the position limiting hole 118 and located between the pressing element 120 and the base 110. When the body (i.e., the user's finger) provides an external force to the pressing element 120, the pressing element 120 moves toward the base 110, so that the elastic element 150 generates a deformation and accumulates an elastic force along with the movement of the pressing element 120. On the contrary, when the body stops to provide an external force to the pressing element 120, the elastic element 150 releases the elastic force, and pushes the pressing element 120 through the elastic force to move in a direction away from the base 110 to the position that before it is exerted by the external force. Accordingly, the elastic element 150 is adapted to accumulate an elastic force when the pressing element 120 moves toward the base 110, and is adapted to release the elastic force to push the pressing element 120 to be away from the base 110, so that the position of the pressing element 120, which moves toward the base 110 when an external force is applied, may automatically be restored when the external force is stopped to be applied. However, disposing or not and the types of the elastic element are not limited in the disclosure, and may be modulated as required.

Referring to FIG. 1 and FIG. 2, in the present embodiment, the key structure 130 includes a circuit membrane 132, a triggering switch 134 and a scissors assembly 136.

The circuit membrane 132 is disposed on the base 110. The triggering switch 134 is disposed on the circuit membrane 132 and electrically connected to the circuit pattern which is located on the circuit membrane 132. The scissors assembly 136 is disposed on the base 110 and connected to the pressing element 120. Furthermore, the key structure 130 further includes a support frame 138 and a balancing rod 139. The support frame 138 is disposed on the base 110, and serves as the lowest layer structure of the key structure 130, and the abovementioned components (the circuit membrane 132, the triggering switch 134 and the scissors assembly 136) are disposed on the support frame 138. By using the support frame 138, it facilitates the key structure 130 to be modularized, and may be directly disposed on the base 110 after assembled in advance. Additionally, the balancing rod 139 is disposed on the support frame 138 and corresponds to the pressing element 120, and is used for balancing the action that the pressing element 120 moves toward the base 110.

As such, the pressing element 120 is adapted to move toward the base 110 through the scissors assembly 136 when the body (i.e., the user's finger) provides an external force, and trigger the triggering switch 134 on the circuit membrane 132. Namely, when the user's finger provides an external force to the pressing element 120, the pressing element 120 pushes the scissors assembly 136 which is connected with it and moves toward the base 110, and accordingly triggers the triggering switch 134 on the circuit membrane 132, as shown in FIG. 3 and FIG. 4 (other components of the key structure 130 are omitted to be illustrated in FIG. 3 and FIG. 4 so as to clearly show the status that the pressing element 120 is exerted by an external force and moves toward the base 110 and at the same time triggers the triggering switch 134 of the key structure 130). However, the disclosure does not limit the composition of the key structure 130, and the key structure 130 may be designed as required.

Referring to FIG. 1 and FIG. 2, in the present embodiment, the wearable triggering device 100 not only may increase the operating feeling of the user and maintain the touch control function of the electronic device (i.e., touch control for starting or operating the related programs of the touch control surface of the electronic device), but also may dispose other functions which may be used to operate the electronic device.

Specifically, in the present embodiment, the wearable triggering device 100 further includes a circuit board 160 and a battery assembly 170. The circuit board 160 and the battery assembly 170 are disposed on the base 110 and electrically connected to each other. The battery assembly 170 may provide an electrical power to the circuit board 160, and the circuit board 160 may perform related operations. For instance, the wearable triggering device 100 may also cooperate with an operating unit 180, wherein the operating unit 180 is disposed on the base 110 (shown in FIG. 2) and electrically connected to the circuit board 160 and the battery assembly 170. The operating unit 180 may be a wireless transmitting module disposed on the base 110, and adapted to be connected to the electronic device for wireless transmission, for example, a Blue-tooth transmission or a Wireless Fidelity (WiFi) transmission. As such, besides the user may increase the operating feeling through the wearable triggering device 100 and maintain the original touch control functions, wireless transmission between the wearable triggering device 100 and the electronic device may also be executed.

In addition, in the present embodiment, the operating unit 180 may also be an infrared module disposed on the base 110 and is adapted to operate the electronic device. For example, when the wearable triggering device 100 is fixed at a body (i.e., the user's finger) through the wearable element 140, the user may perform the actions such as page moving, page enlarging, page zooming or page turning with respect to the displayed image of the electronic device, through the infrared module with gestures without touching the electronic device. Similarly, in other embodiments, the operating unit 180 may also be a sensing device, and alternatively may be disposed on the pressing element 120 and is adapted to operate the electronic device. For example, when the wearable triggering device 100 is fixed at the body (i.e., the user's finger) through the wearable element 140, the user may contact the sensing device located on the pressing element 120 by the finger, e.g., serving the sensing device as a mouse, and the user may perform the actions such as page moving, page enlarging, page zooming or page turning with respect to the displayed image of the electronic device, through the sensing device without touching the electronic device. As such, it can be noted that, the position and the type of the operating unit 180 are not limited in the disclosure, and may be designed according to actual requirements, and the wearable triggering device 100 may also cooperate with the abovementioned operating unit 180 as required (e.g., at the same time provided with the wireless transmitting module, the infrared module and/or the sensing device), and the disclosure is not limited thereto.

In addition, in the present embodiment, the wearable triggering device 100 further includes a magnetic assembly 190 disposed on the base 110, the pressing element 120 or the wearable element 140. FIG. 2 of the embodiment shows as an example that the magnetic assembly 190 is disposed on the base 110. The magnetic assembly 190 is adapted to be absorbed on the removing device which is not shown in the drawings, so that the wearable triggering device 100 release from the body (i.e., the user's finger). In other words, when the user no longer needs to use the wearable triggering device 100 and wants to remove the wearable triggering device 100 from the finger, the user does not need to detach the wearable element 140 manually, and merely needs to move the finger together with the wearable triggering device 100 to the removing device which is not shown in the drawings, then through the magnetic attraction between the removing device and the magnetic assembly 190, the wearable triggering device 100 may be absorbed to the removing device, and then the wearable triggering device 100 may be removed from the user's finger. Similarly, the magnetic assembly 190 may also be disposed on the wearable element 140, so that the wearable element 140 may be absorbed to the removing device through the magnetic assembly 190 and automatically releases the snapping and may be absorbed to the removing device. The position, quantity and whether to be disposed or not, of the magnetic assembly 190 are not limited in the disclosure, and may be modulated as required.

In light of the foregoing, in the wearable triggering device of the disclosure, the wearable triggering device is adapted to be fixed at a body through the wearable element, for example, fixed at a user's finger, and when the body contacts another body through the wearable triggering device, i.e., when the user's finger contacts an electronic device through the wearable triggering device, the body provides an external to the pressing element, so as to make the pressing element move toward the base and trigger the key structure. As such, the key structure may provide an operating feeling of imitating mechanical keyboard when the user operates the electronic device through the wearable triggering device. In addition, the wearable triggering device may also be provided with a circuit board, a battery or an operating unit as required, and may be used for operating the electronic device, so as to increase the useful functions of the wearable triggering device. As such, the wearable triggering device of the disclosure may be used for increasing the operating feeling of the user when the body is triggered, and may be used for operating the electronic device.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A wearable triggering device, comprising:
    a base;
    a pressing element, pivotally disposed on the base;
    a key structure, disposed between the base and the pressing element;
    a wearable element, disposed on the base, so that the wearable triggering device is adapted to be fixed at a body through the wearable element, wherein when the body contacts another body through the wearable triggering device, the body provides an external force to the pressing element, so as to make the pressing element move toward the base and trigger the key structure; and
    wherein the pressing element has a protruding point, the protruding point protrudes toward the base and props on the base, and when the body provides an external force to the pressing element, an end of the pressing element, which is away from the protruding point, moves toward the base due to deformation.

2. The wearable triggering device as claimed in claim 1, wherein the pressing element has a position limiting post, the base has a position limiting hole, the position limiting post passes through the position limiting hole and moves along the position limiting hole when the pressing element moves toward the base.

3. The wearable triggering device as claimed in claim 1, further comprising an elastic element disposed between the pressing element and the base, wherein the elastic element is adapted to accumulate an elastic force when the pressing element moves toward the base, and adapted to push the pressing element to move away from the base by releasing the elastic force.

4. The wearable triggering device as claimed in claim 1, wherein the key structure comprises:
    a circuit membrane, disposed on the base;
    a triggering switch, disposed on the circuit membrane; and
    a scissors assembly, disposed on the base and connected to the pressing element, so that when the body provides an external force, the pressing element is adapted to move toward to the base through the scissors assembly and trigger the triggering switch which is located on the circuit membrane.

5. The wearable triggering device as claimed in claim 1, further comprising a circuit board and a battery assembly, wherein the circuit board and the battery assembly are disposed on the base and electrically connected with each other.

6. The wearable triggering device as claimed in claim 1, further comprising a wireless transmitting module disposed on the base, wherein the wireless transmitting module is adapted to be connected to an electronic device for wireless transmission.

7. The wearable triggering device as claimed in claim 1, further comprising an infrared module disposed on the base and adapted to operate an electronic device.

8. The wearable triggering device as claimed in claim 1, further comprising a sensing device disposed on the pressing element and adapted to operate an electronic device.

9. The wearable triggering device as claimed in claim 1, further comprising a magnetic assembly disposed on the base, the pressing element or the wearable element, wherein the magnetic assembly is adapted to be absorbed on a removing device, so that the wearable triggering device releases from the body.

10. A wearable triggering device, comprising:
    a base;
    a pressing element, pivotally disposed on the base;
    a key structure, disposed between the base and the pressing element;
    a wearable element, disposed on the base, so that the wearable triggering device is adapted to be fixed at a body through the wearable element, wherein when the body contacts another body through the wearable triggering device, the body provides an external force to the pressing element, so as to make the pressing element move toward the base and trigger the key structure; and
    wherein the pressing element has a position limiting post, the base has a position limiting hole, the position limiting post passes through the position limiting hole and moves along the position limiting hole when the pressing element moves toward the base.

11. The wearable triggering device as claimed in claim 10, wherein the pressing element has a protruding point, the protruding point protrudes toward the base and props on the base, and when the body provides an external force to the pressing element, an end of the pressing element, which is away from the protruding point, moves toward the base due to deformation.

12. The wearable triggering device as claimed in claim 10, further comprising an elastic element disposed between the pressing element and the base, wherein the elastic element is adapted to accumulate an elastic force when the pressing element moves toward the base, and adapted to push the pressing element to move away from the base by releasing the elastic force.

13. The wearable triggering device as claimed in claim 10, wherein the key structure comprises:
    a circuit membrane, disposed on the base;
    a triggering switch, disposed on the circuit membrane; and
    a scissors assembly, disposed on the base and connected to the pressing element, so that when the body provides an external force, the pressing element is adapted to move toward to the base through the scissors assembly and trigger the triggering switch which is located on the circuit membrane.

14. The wearable triggering device as claimed in claim 10, further comprising a circuit board and a battery assembly, wherein the circuit board and the battery assembly are disposed on the base and electrically connected with each other.

15. The wearable triggering device as claimed in claim 10, further comprising a wireless transmitting module disposed on the base, wherein the wireless transmitting module is adapted to be connected to an electronic device for wireless transmission.

16. The wearable triggering device as claimed in claim 10, further comprising an infrared module disposed on the base and adapted to operate an electronic device.

17. The wearable triggering device as claimed in claim 10, further comprising a sensing device disposed on the pressing element and adapted to operate an electronic device.

18. The wearable triggering device as claimed in claim 10, further comprising a magnetic assembly disposed on the base, the pressing element or the wearable element, wherein the magnetic assembly is adapted to be absorbed on a removing device, so that the wearable triggering device releases from the body.

* * * * *